Nov. 22, 1966  J. MELTZER  3,287,602
CONDUCTIVE SHOE AND REPAIR INSERT THEREFOR
Filed Aug. 19, 1964  2 Sheets-Sheet 1
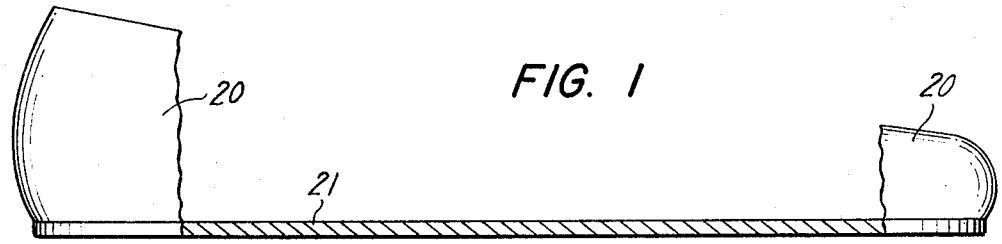
FIG. 1
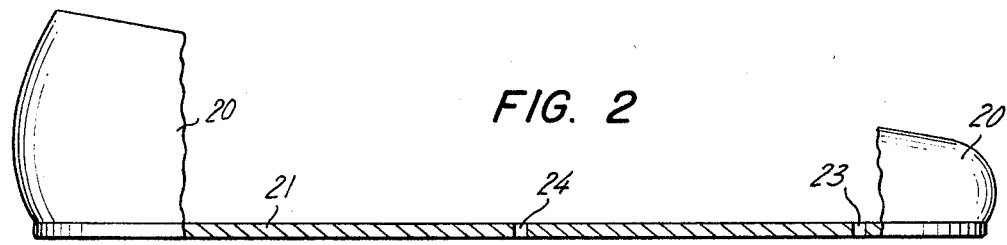
FIG. 2
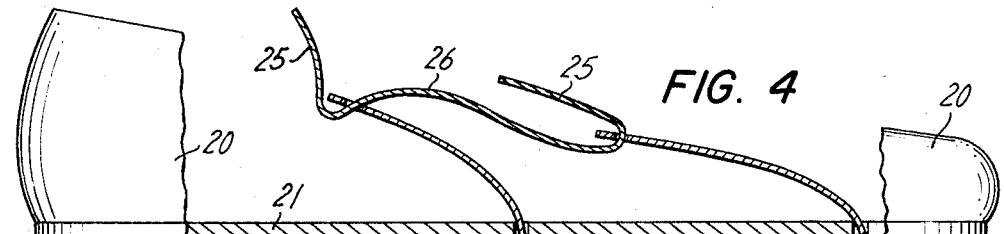
FIG. 4
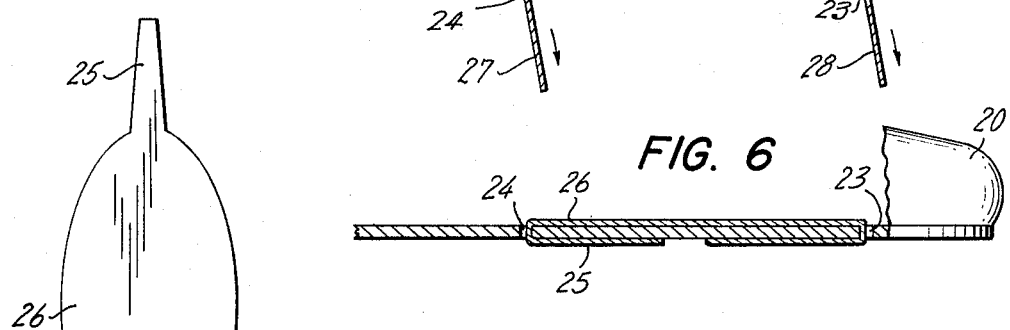
FIG. 6
FIG. 3
FIG. 7
FIG. 5
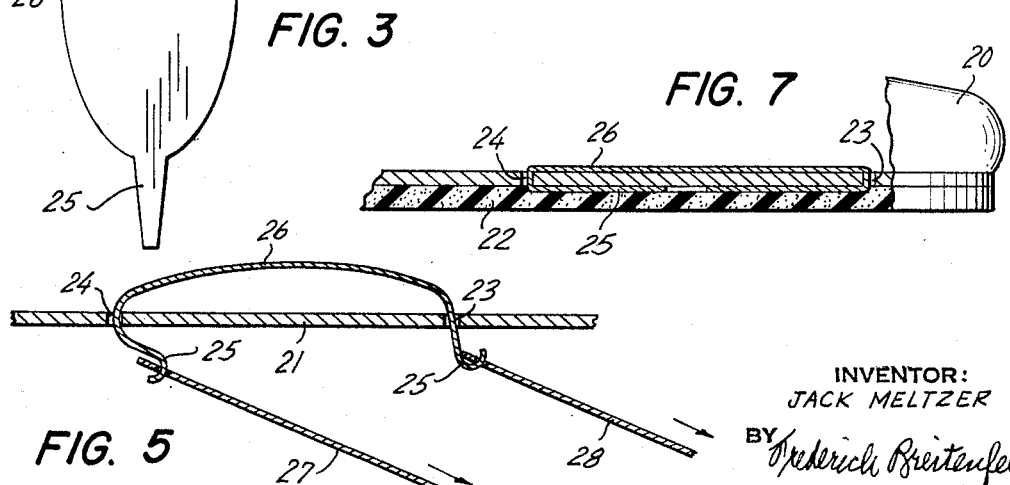
INVENTOR:
JACK MELTZER
BY Frederick Breitenfeld
ATTORNEY Nov. 22, 1966                J. MELTZER                3,287,602
              CONDUCTIVE SHOE AND REPAIR INSERT THEREFOR
Filed Aug. 19, 1964                              2 Sheets-Sheet 2
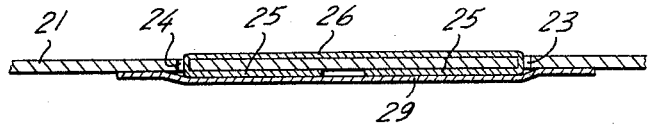
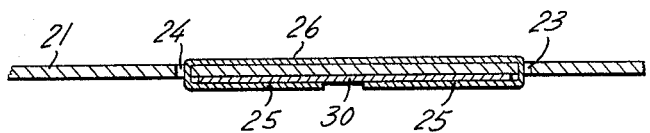
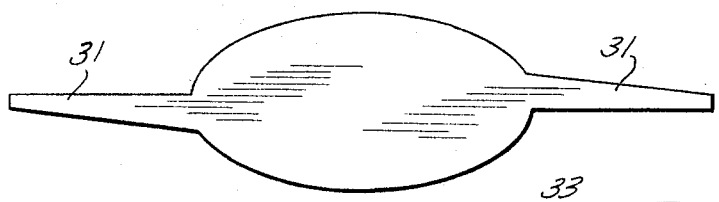
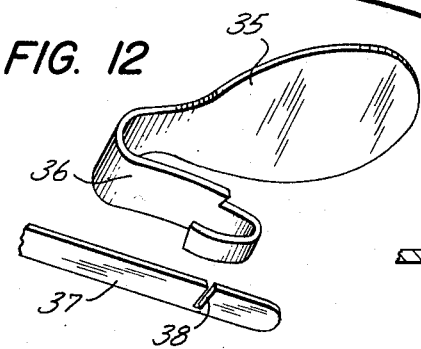
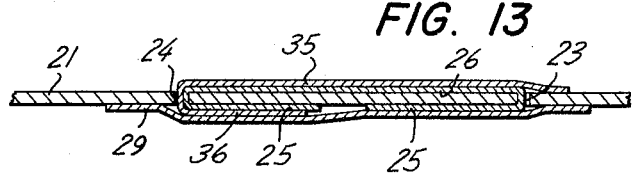
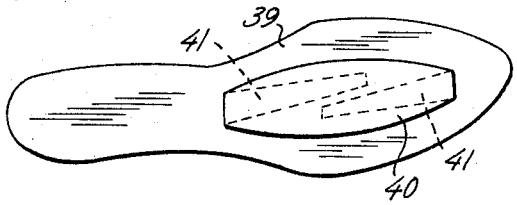
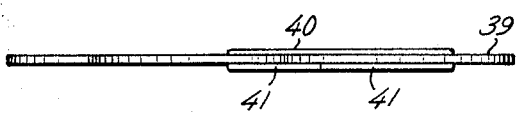
INVENTOR:
JACK MELTZER
BY Frederick Breitenfeld
ATTORNEY

United States Patent Office 3,287,602
Patented Nov. 22, 1966

3,287,602
CONDUCTIVE SHOE AND REPAIR INSERT THEREFOR
Jack Meltzer, 544 N. Laurel Ave., Hollywood, Calif.
Filed Aug. 19, 1964, Ser. No. 390,563
2 Claims. (Cl. 317—2)

This invention relates generally to footwear, and has particular reference to shoes known as conductive shoes, capable of establishing an electrical connection between the wearer and the ground, to prevent the build-up of potentially dangerous static charges.

Articles of footwear currently available on the market are of highly varied character. Users have a wide selection among many styles and types of shoes. They vary not only in the mode of manufacture, but also with respect to the colors used, the materials employed, the types and styles of heels, platforms, toe constructions, and in other similar ways. Because electrically conductive shoes are of a specialized kind, appealing to a relatively limited market, no manufacturer can feasibly supply conductive shoes in a variety of styles. It is a general objective of this invention to overcome this problem.

It is a more particular object of the invention to provide a method of making conductive shoes whereby any kind or style of shoe can be readily converted, during the course of its manufacture, to make it electrically conductive. By means of the improved procedure, it is possible, in a commercially practical manner, to impart conductive qualities to any kind of shoe, regardless of its method of manufacture or the materials of which it is made, thus widening the market for conductive shoes and overcoming the problems of economics which have heretofore made it difficult or impossible to provide conductive shoes of stylish and attractive character.

The invention is predicated upon the initial furnishing of a shoe having a partially-finished sole structure. The term "partially-finished" refers to a sole structure which consists only of an inner component whose top surface will ultimately be exposed on the inside of the shoe. The invention can thus be practiced by any manufacturer of shoes, by interrupting his normal process at the stage at which the sole structure consists of only an inner component; or it can be practiced by an independent manufacturer or converter who can acquire shoes with partially-finished sole structures from any of a wide variety of sources of manufacture.

The improved procedure involves the formation of a pair of spaced slits in the inner component of the sole structure; the mounting of a flat flexible conductive element so that its mid-portion lies flat against the top surface of the slitted component while its opposite ends extend through the slits and lie flat against the under face of the slitted component; and the furnishing of a conductive outer sole component which is secured to the partially-finished structure to sandwich said ends in a concealed disposition and in electrical contact with the outer sole.

Another object of the invention is to provide a method of manufacture, and a resultant conductive shoe, which lends itself readily to the application of a "repair" element or overlay without requiring cumbersome or complex dismantling and reassembly of the sole structure.

A further object of the invention is to provide a special kind of shoe insert which can be readily applied to the conductive shoe, after any desired period of use, to enhance its appearance and fit, and to improve the qualities of the conductive element that contacts the wearer's foot.

Another object of the invention is to provide a sole structure in which special conductive material of flat flexible character is incorporated in such a way that an electrically conductive path of reliable nature is constantly effective, regardless of the posture or foot movements of the wearer of the shoe, and regardless of the basic nature of the manufacturing process from which the shoe stems.

Several ways of achieving these objects, and such other benefits and advantages as may hereandafter appear or be pointed out, are shown by way of example in the accompanying drawings, in which—

FIGURE 1 is a schematic longitudinal cross-sectional view of a shoe provided with a sole structure which comprises only an inner component;

FIGURE 2 is a similar view showing the inital step in practicing the present invention;

FIGURE 3 is a plan view of a conductive element to be associated with the sole structure component shown in FIGURE 2;

FIGURES 4 and 5 are similar views showing successive stages in applying the element of FIGURE 3 to the structure of FIGURE 2;

FIGURES 6 and 7 are similar views showing successive stages in the completion of the conductive shoe;

FIGURES 8 and 9 are fragmentary views, similar to FIGURE 6, showing modifications of the procedure;

FIGURE 10 is a plan view of a conductive element, similar to that shown in FIGURE 3, but of slightly modified kind;

FIGURE 11 is a fragmentary view showing the nether face of the inner sole component, with an element such as that of FIGURE 10 associated therewith;

FIGURE 12 is a perspective view of a repair element and tool for applying it;

FIGURE 13 is a view similar to FIGURE 8 showing a repair element such as that shown in FIGURE 12 in its final applied position;

FIGURE 14 is a plan view of a special repair insert that may be optionally employed; and FIGURE 15 is an end edge view of the element of FIGURE 14.

Since it is the essence of the invention to impart electric conductivity to a shoe, regardless of the method of its manufacture, its contour, shape, style, or other attributes, the representation of FIGURE 1 (and of FIGURES 2–7) is intended to depict a shoe upper 20, and the inner component 21 of a partially-completed sole structure. The upper 20 may be of any desired kind, and as will be readily understood it may assume a wide variety of shapes, colors, and degrees of completeness or openness of structure; in some cases it may consist of nothing more than a strap or similar part for holding the shoe in position on the foot of the wearer.

Similarly, the sole structure component designated 21 may be composed of a plurality of parts or elements, as will be readily understood, and it may have any desired thickness, stiffness, or contour. The essential point is that the shoe intended to be depicted in FIGURE 1 is incomplete, in that the component 21 of the sole structure is only that part whose top surface will ultimately be exposed on the inside of the shoe. To complete the shoe, an outer sole structure component, designated by the reference numeral 22 in FIGURE 7, must still be added.

The first step in treating the shoe with the partially-finished sole structure is to provide or form a pair of transverse slits 23 and 24 in the component 21, as shown in FIGURE 2. The slit 23 is near the front of the shoe, and the slit 24 is at an appreciable distance rearwardly from the slit 23, preferably at or near the shank region of the shoe.

Depending upon the material or materials of which the sole structure component 21 is composed, the slits 23 and 24 may be formed with any appropriate tool. They are made large enough to accommodate the two oppositely extending ends 25 of a conductive element of the character shown in FIGURE 3.

The element chosen for illustration in FIGURE 3 has a mid-portion 26 of substantially elliptical shape. The parts 26 and 25 are preferably integral, the entire element being composed of any desired or suitable flat flexible electrically conductive material having, of course, adequate wear-resistant characteristics.

To apply the element of FIGURE 3 to the slitted component shown in FIGURE 2, a pair of relatively rigid but springy tools 27 and 28 (see FIGS. 4 and 5) are first inserted upwardly through the slits 23 and 24, respectively, their upper ends being then releasably engaged with the tails or ends 25 of the element shown in FIGURE 3. The tools 27, 28 are composed of inexpensive plastic or composition material, relatively stiff in nature but flexible enough to bend readily without breaking. A relatively narrow strip of uniform width is satisfactory, and the width is no greater than that of the slit through which it is introduced. At the end engaging the conductive element, each tool is provided with a slit or notch by means of which a releasable engagement can be effected.

By pulling the tools 27 and 28 downwardly in the direction of the arrows, the conductive element is brought into the position shown FIGURE 6, in which the relatively large mid-portion 26 lies flat against the top surface of the sole component 21, whereas the ends 25 lie flat against the nether face of the component 21, in the area between the slits 23, 24. The mid-portion 26 may be provided with adhesive to hold it against the face upon which it rests. The ends 25 may similarly be attached by adhesive means to the under-side of the component 21, although such adhesive attachment is not essential in all cases.

The sole structure is completed by applying the outer sole component 22. This is an element of any desired shape or contour, and is only schematically represented in FIGURE 7. It may be secured to the upper part of the shoe in any desired manner or by any desired procedure. The essential point is that it is composed of electrically conductive material, and that it is brought into a position in which it establishes electrical contact with parts 25 of the electrically conductive element of FIGURE 3. Where adhesive means are employed to secure the outer sole 22, it is customary practice to apply the adhesive only to the marginal regions, thus leaving the parts 25 free of attachment to the sole structure component 22.

It will thus be noted that, except for the completion of the sole structure, the shoe can be finished in all other respects before the features of this invention are applied to it. The finished shoe, therefore, embodies the style, appearance, and quality of the shoe that is initially subjected to the present treatment, and its conversion to an article of footwear having electrically conductive properties has not impaired its general nature and appearance.

In FIGURES 8 and 9, it is assumed that the practice of the invention has reached the stage shown in FIGURE 6. FIGURE 8 illustrates a modification in the procedure whereby an added piece 29 of flat flexible electrically conductive material is applied over the areas 25 to provide a relatively large conductive area with which the outer sole 22 may establish contact when it is applied. The element 29 may have any suitable shape, preferably elliptical somewhat like that of the element shown in FIGURE 3. Its dimensions are such (for a purpose presently to be described) whereby its rear end region extends over the slit 24. The part 29 is marginally secured, by adhesive means, to the under-face of the sole component 21.

In FIGURE 9 a similar additional element 30 is provided, but in this case the element is interposed between the parts 25 and the sole component 21. This means that the length of the added piece 30 can be no greater than the distance between the slits 23, 24. Its width, however, is greater than that of the parts 25, thus providing a relatively large area with which the outer sole 22 may establish contact when it is applied to the shoe.

In FIGURE 10 a conductive element is shown, slightly modified in contour with respect to that shown in FIGURE 3. In this case the ends or tails 31 are longer and narrower, and are so contoured that when the parts are assembled, as shown in FIGURE 11, the ends 31 may lie side by side. In FIGURE 11, 32 represents an added conductive piece, similar to that shown at 30 in FIGURE 9, interposed between the parts 31 and the under surface of the sole component 21. FIGURE 11 also indicates by means of the dot-dash line 33, the marginal region 34 to which adhesive is applied for the purpose of holding the outer sole component in position, if adhesive is used for the purpose.

In FIGURE 12 a repair element 35 is shown, composed of flat flexible conductive material, having an enlarged region and a narrower tail 36 extending from one end. The tail may be further reduced in width at its extreme end, for releasable engagement with a tool or pusher 37 of the character shown. To establish the desired releasable engagement, the tool 37 has been illustratively shown provided with a transverse slot or notch 38. The tool 37 is relatively stiff and flexible. It is used as follows:

Should the mid-portion 26 of the conductive element within a shoe become worn, the repair element of FIGURE 12 may be engaged with the pusher strip 37, and the assembly may then be pushed downwardly through the slit 24, to bring the tail 36 into contact with the end 25 (or the end 31, as the case may be). The pusher 37 will retain its grip upon the tail 36 until it has been inserted to the desired degree. Then, by continuing to push on the tool 37 but by holding back on the part 36 (or 35) a release of the tail 36 from the notch 38 will take place, whereupon the tool 37 may be freely removed. This leaves the tail 36 in electrical contact with conductive parts lying on the underside of the element 21, and it leaves the relatively large conductive area 35 free for adhesive attachment to the top surface of the conductive element which is to be replaced or revitalized. Preferably, the area of the part 35 is such that its edges will extend beyond the edges of the conductive area it covers.

FIGURE 13 shows the repair element of FIGURE 12 applied to a shoe in which the parts of FIGURE 8 were initially present. For this reason, the reference numerals applied in FIGURE 8 have been repeated in FIGURE 13. The fact that the added piece 29 is free of attachment to the parts 25, as hereinbefore described, makes it possible for the tail 36 of the repair element to assume the position shown in FIGURE 13.

It will thus be seen that the invention not only makes it possible to impart electric conductivity to any kind of shoe, regardless of its basic nature or method of manufacture, but that it provides this conductivity in such a way that replenishment or repair can be readily achieved by the user, without recourse to complex procedures and without requiring special skills.

As an optional insert for the shoe, to restore it after a period of wear, the element 39 of FIGURES 14–15 may be used. It is composed of a sheet or blank of flat non-conductive material, relatively stiff and form-retaining. Its contour is such that it will fit snugly into the shoe. It can be made in various sizes, and in sets for left and right shoes. At spaced regions it is provided with transverse slits similar to those shown at 23, 24. Associated with the element is a conductive element of flat flexible material having a mid-portion 40 of appreciable size and ends 41 passing through the slots to lie on the underside. Preferably the parts are adhesively held together as a unit, and if desired, additional larger pieces, such as those referred to at 29, 30, and 32, can be employed. The insert, when introduced into a shoe, serves to establish contact between the conductive parts (e.g., ends 41) and the conductive part exposed in the shoe. This maintains the shoe's quality of electric conductivity when the wearer's foot rests upon the part 40. The insert can serve, also, to restore comfort, sightliness, and fitting qualities.

It will be understood that the details herein described and illustrated can be modified in numerous respects without necessarily departing from the spirit and scope of the invention as expressed in the appended claims.

What is claimed is:

1. An insert for a completed shoe, the shoe being of a kind in which the foot-engaging top surface of the sole structure has a conductive part in electrical contact with a conductive outer sole, said insert comprising a substantially flat non-conductive element contoured to fit snugly within the completed shoe in overlying relation to said foot-engaging top surface of the sole structure, a pair of spaced slits in said insert, and a flat flexible conductive element having a midportion lying flat on the upper face of said insert and opposite ends extending downwardly through said slits and lying flat on the nether face of said insert, said ends being adapted to establish contact with the conductive part of the top surface of the sole structure of the completed shoe.

2. An insert for a shoe, as defined in claim 1, said non-conductive element being relatively stiff.

References Cited by the Examiner

UNITED STATES PATENTS

| 2,933,651 | 4/1960 | Legge | 317—2 |
| 3,196,314 | 7/1965 | Meltzer | 317—2 |
| 3,200,292 | 8/1965 | Meltzer | 317—2 |

MILTON O. HIRSHFIELD, *Primary Examiner.*

J. A. SILVERMAN, *Assistant Examiner.*